(12) United States Patent
Nordlund et al.

(10) Patent No.: US 8,289,319 B2
(45) Date of Patent: Oct. 16, 2012

(54) APPARATUS AND METHOD FOR PROCESSING PIXEL DEPTH INFORMATION

(75) Inventors: Petri O. Nordlund, Vanhalinna (FI); Mika H. Tuomi, Noormarkku (FI)

(73) Assignee: ATI Technologies ULC, Markham, Ontario (CA)

( * ) Notice: Subject to any disclaimer, the term of this patent is extended or adjusted under 35 U.S.C. 154(b) by 854 days.

(21) Appl. No.: 11/868,814

(22) Filed: Oct. 8, 2007

(65) Prior Publication Data

US 2009/0091569 A1    Apr. 9, 2009

(51) Int. Cl.
*G06T 15/40*    (2011.01)

(52) U.S. Cl. ........ 345/422; 345/419; 345/421; 345/428; 345/506; 345/619

(58) Field of Classification Search .................. 345/419, 345/421, 422, 506, 522, 531, 426, 536, 563, 345/582, 629, 428
See application file for complete search history.

(56) References Cited

U.S. PATENT DOCUMENTS

| | | | |
|---|---|---|---|
| 5,870,097 A * | 2/1999 | Snyder et al. | 345/426 |
| 6,380,935 B1 | 4/2002 | Heeschen et al. | |
| 6,577,305 B1 * | 6/2003 | Duluk et al. | 345/419 |
| 6,636,215 B1 * | 10/2003 | Greene | 345/422 |
| 6,650,323 B2 * | 11/2003 | Naegle et al. | 345/419 |
| 6,697,063 B1 | 2/2004 | Zhu | |
| 6,781,585 B2 * | 8/2004 | Naegle et al. | 345/501 |
| 7,391,418 B2 * | 6/2008 | Pulli et al. | 345/421 |
| 7,450,120 B1 * | 11/2008 | Hakura et al. | 345/421 |
| 7,505,036 B1 * | 3/2009 | Baldwin | 345/421 |
| 7,733,341 B2 * | 6/2010 | Pulli et al. | 345/421 |
| 7,755,624 B1 * | 7/2010 | Hakura et al. | 345/421 |
| 2004/0212614 A1 | 10/2004 | Aila et al. | |

FOREIGN PATENT DOCUMENTS

EP    1 439 493 A2    7/2004

OTHER PUBLICATIONS

Aila, Timo, "Delay Streams for Graphics Hardware," SIGGRAPH 2003.

* cited by examiner

*Primary Examiner* — Kimbinh T Nguyen
(74) *Attorney, Agent, or Firm* — Faegre Baker Daniels LLP

(57) ABSTRACT

An apparatus for rendering an image includes a command binning module. The command binning module generates binned image information by classifying command information into bins that each correspond to a display tile of an image to be rendered. The command binning module generates image depth information for each display tile based on the binned command information.

16 Claims, 3 Drawing Sheets

APPARATUS AND METHOD FOR PROCESSING PIXEL DEPTH INFORMATION

FIELD

The present disclosure generally relates to methods and apparatus for rendering based on pixel depth information and, more particularly, to an minimizing processing resources and time required to render when using pixel depth information.

BACKGROUND

Some conventional graphics processing systems include a binning engine and a rendering engine. The binning engine classifies associated geometries of drawing commands for an image frame that includes a number of tiles. More specifically, the binning engine determines which tiles are touched by each geometry and stores the drawing command for each geometry touching the tile in a respective memory bin corresponding to the tile.

The rendering engine accesses the drawing commands from the memory bins to render an image for display. More specifically, the rendering engine retrieves drawing commands from each memory bin to render the relevant portion of an image within the respective tile of a frame. When rendering the image, the rendering engine initializes a pixel depth buffer (or z buffer) to an initial value representing a pixel depth value (or z value) at the back (or near) clipping plane. The rendering engine also initializes a color buffer to a value (e.g., zero) representing the background color of the image. The rendering engine compares a previous pixel depth value (e.g., zero when first initialized) stored in the pixel depth buffer against a current pixel depth value. If the current pixel is behind the previous pixel in the pixel depth buffer, the pixel is rejected, otherwise the pixel is shaded, the pixel color is written to a color buffer and the current pixel depth value replaces the previous pixel depth value in the pixel depth buffer.

In one method, the rendering engine can discard a pixel as soon as the pixel depth is known, which makes it possible to skip the additional rendering processes (e.g., shading, lighting, and texturing) for a pixel that would not be visible. However, if the geometry is drawn from back to front, no pixels can be discarded because all of the pixels will pass the pixel depth test.

In another method, the rendering engine compares current pixel depth values to previous pixel depth values and populates the pixel depth buffer based thereon. The drawing commands are then stored one at a time in a first in first out (FIFO) buffer in order to delay the rendering. While the drawing commands are in the FIFO buffer, the rendering engine receives additional drawing commands and updates the pixel depth buffer based thereon. Once the FIFO buffer is full, the rendering engine compares the pixel depth values of the drawing commands in the FIFO buffer to the pixel depth values in the pixel depth buffer to determine which pixels are visible. The rendering engine then renders the drawing commands that have visible pixels from the FIFO buffer. Although this method works, it requires additional processing resources and delays the drawing commands to be rendered, which increases rendering time.

Accordingly, there is a need to reduce processing resources and time required to process drawing commands to render an image.

BRIEF DESCRIPTION OF THE DRAWINGS

The disclosure will be more readily understood in view of the following description when accompanied by the below figures and wherein like reference numerals represent like elements.

DETAILED DESCRIPTION OF THE PRESENT EMBODIMENTS

In one example, an apparatus for rendering an image includes a command binning module and an image rendering module. During a command binning pass, the command binning module generates binned command information by classifying command information into bins that each correspond to a display tile of an image to be rendered. In addition, the command binning module generates image depth information for each display tile based on the binned command information. During a rendering pass, which is subsequent to the command binning pass, the image rendering module populates a pixel depth buffer with pixel depth information based on the image depth information generated by the command binning module. In addition, the image rendering module renders the image based on the binned command information and the pixel depth information. A related method is also disclosed.

The apparatus and method may provide, among other advantages, image depth information prior to the rendering pass, which allows an increased number of drawing commands to be discarded earlier than by conventional methods. In addition, providing image depth information prior to the rendering pass effectively reduces processing resources of the image rendering module and reduces time required to render the image. Other advantages will be recognized by those of ordinary skill in the art.

In one example, the apparatus includes an image depth buffer that stores the image depth information for each display tile. The image rendering module sets each pixel depth value of the pixel depth buffer based on the pixel depth information.

In one example, the pixel depth information is based on the pixel depth value that is closest to a back culling plane or a near culling plane of the image.

In one example, the apparatus includes a color buffer. The image rendering module provides a rendered tile of the image to the color buffer by rendering the binned command information corresponding to the display tile of the image.

In one example, the apparatus includes a frame buffer. The image rendering module copies the rendered tile to the frame buffer. The frame buffer provides a rendered frame of the image based on at least the rendered tile.

As used herein, the term "module" can include an electronic circuit, one or more processors (e.g., shared, dedicated, or group of processors such as but not limited to microprocessors, DSPs, or central processing units), and memory that execute one or more software or firmware programs, combinational logic circuits, an ASIC, and/or other suitable components that provide the described functionality. Additionally, as will be appreciated by those of ordinary skill in the art, the operation, design, and organization, of a "module" can be described in a hardware description language such as Verilog, VHDL, or other suitable hardware description languages.

Figure 1:
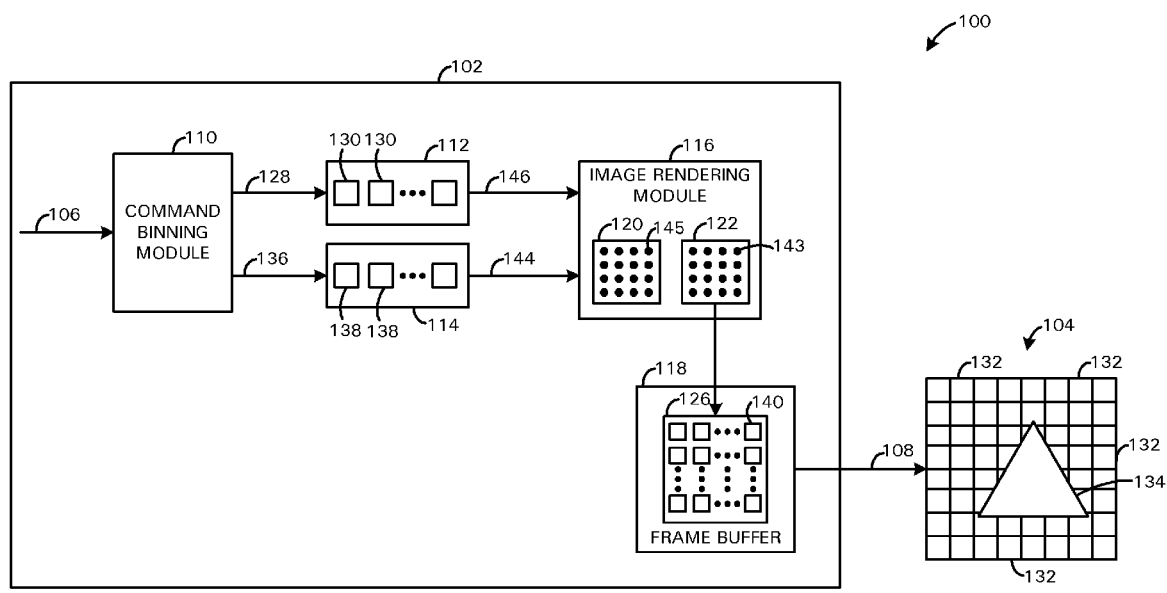
FIG. 1 is an exemplary functional block diagram of a portion of a device that includes an apparatus for rendering an image according to the present disclosure.

Referring now to FIG. 1, a portion of a device 100 such as a wireless phone, a mobile and/or stationary computer, a printer, a media player, a video decoder and/or encoder, and/ or other suitable device is depicted. The device 100 includes an apparatus 102 for processing an image and a display 104 for displaying the processed image. More specifically, the apparatus 100 receives drawing command information 106 and renders display image information 108 to display an image on the display 104.

The apparatus 102 includes a command binning module 110, a command binning buffer 112, an image depth buffer 114, an image rendering module 116, and, in some embodiments, a frame buffer 118. The image rendering module 116 includes a pixel depth buffer 120 and a pixel color buffer 122. Although depicted as internal buffers in this example, buffers 112, 114, 118, 120, and 126 can individually or collectively be external buffers/memories if desired. The frame buffer 118 includes a frame color buffer 126. Although the frame buffer 118 is depicted as internal to the apparatus 102 in this example, skilled artisans will appreciate that the frame buffer 118 can be external and operatively coupled to the apparatus 102 via, for example, a memory bus (not shown).

During operation, the apparatus 102 first performs a binning pass using the command binning module 110. More specifically, the command binning module 110 receives the drawing command information 106 from, for example, a system processor (not shown). The command binning module 110 generates binned command information 128 by classifying the drawing command information 106 into drawing command bins 130 that each correspond to a display tile 132 of an image 134 to be rendered on the display 104. Each display tile 132 comprises N×M pixels to be rendered. In some embodiments, each display tile 132 can be 4×4 pixels although other sizes can be used.

The command binning module 110 determines which display tiles 132 are touched by geometry (e.g., points, lines, triangles, quadrilaterals, parallelograms, trapezoids, and/or other suitable geometries) of the drawing command information 106 and classifies the drawing command 106 for each geometry touching the display tile 132 in a respective drawing command bin 130 that corresponds to the display tile 132. The drawing command bins 130 are then stored in the command binning buffer 112.

In addition, the command binning module 110 generates image depth information 136 for each display tile 132 based on the binned command information 128. In some embodiments, the image depth information 136 can be based directly on the drawing command information 106. The image depth information 136 is stored in the image depth buffer 114 as image depth bins 138 that each correspond to the drawing command bins 130 and the display tiles 132. Each image depth bin 138 includes a tile depth value corresponding to the furthest depth value of all the pixels of the display tile 132 (e.g., the depth value closest to the back culling plane or near culling plane of the image 134).

Once the binning pass has been performed, the apparatus 102 subsequently performs a rendering pass using the image rendering module 116. More specifically, the image rendering module 116 initializes pixel color values 143 in the pixel color buffer 122 to an initial color value (e.g., zero). Once the pixel color buffer 122 has been initialized, the image rendering module 116 retrieves image depth information 144 corresponding to the image depth bin 138 from the image depth buffer 114 and stores the value of the image depth bin 138 for each pixel depth value 145 in the pixel depth buffer 120.

The image rendering module 116 retrieves binned drawing command information 146 corresponding to the drawing command bin 130 that corresponds to the image depth bin 138 and renders the drawing command information 146 to the pixel color buffer 122 taking into account each pixel depth value 145 stored in the tile depth bin 120. More specifically, the image rendering module 116 compares the pixel depth value 145 to a current pixel depth value of the binned drawing command information 146. If the current pixel depth value is behind the pixel depth value 145, the pixel is rejected, otherwise the pixel is rendered to pixel color buffer 122 and subsequently copied to the frame color buffer 126 of the frame buffer 118 as a rendered tile 140. In addition, if the pixel depth value 145 is behind the current pixel depth value, the pixel depth value 145 is updated the to the current pixel depth value. The display 104 receives display image information 108 based on the rendered tiles 140 and displays the image 134 based thereon.

Since image depth information 136 is provided prior to the rendering pass, the image rendering module 116 can discard an increased number of drawing commands and pixels earlier than by conventional methods. In addition, providing image depth information prior to the rendering pass can reduce processing resources of the image rendering module and time required to render the image.

Figure 2:
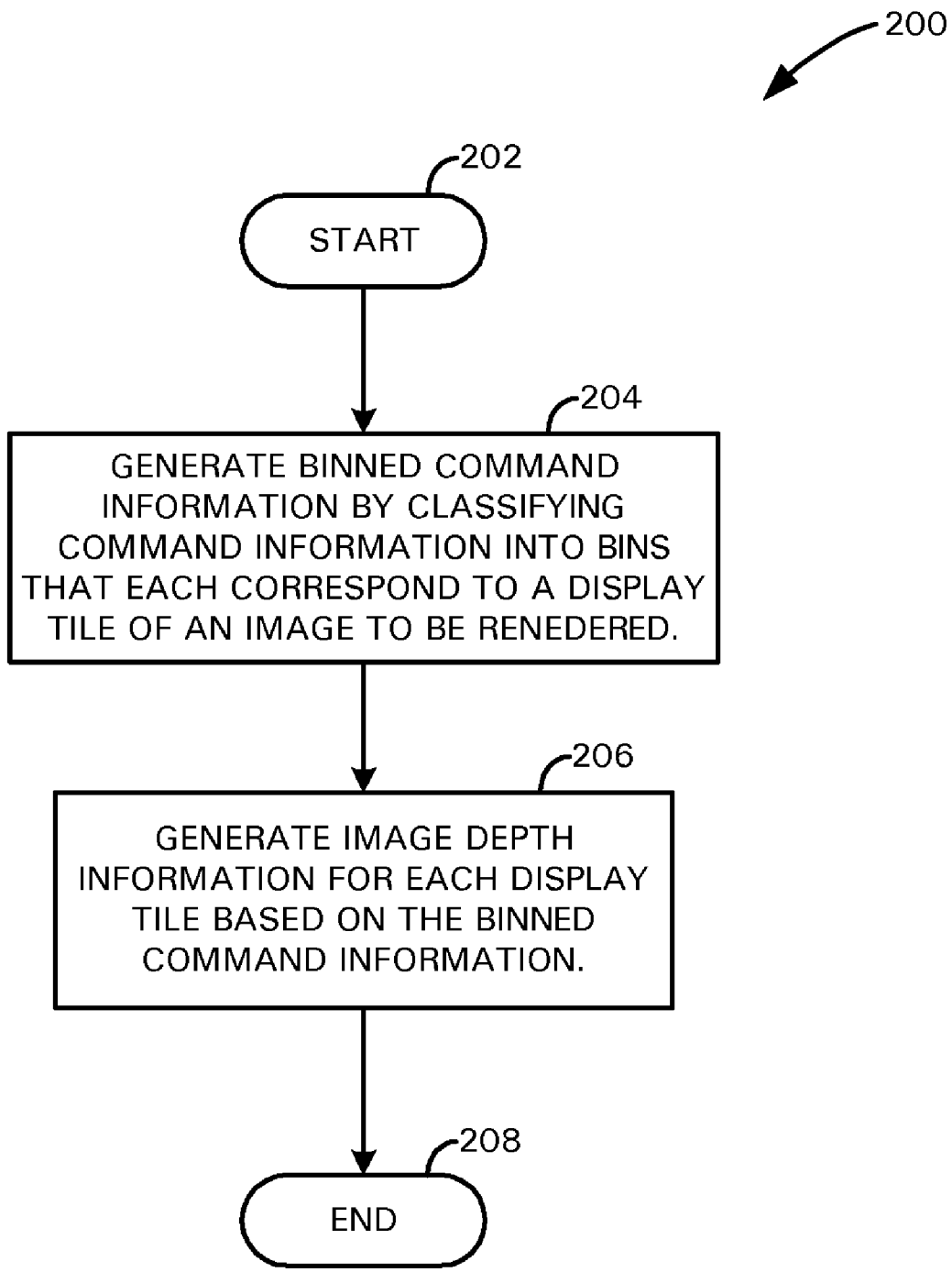
FIG. 2 is a flow chart depicting exemplary steps that can be taken by a command binning module of the apparatus.

Referring now to FIG. 2, exemplary steps that can be taken by the apparatus 102 during the command binning pass are generally identified at 200. The process starts in step 202 when the command binning module 100 receives the drawing command information 106. In step 204, the command binning module 100 generates the binned image information 128 by classifying the command information 106 into the drawing command bins 130 that each correspond to the display tile 132 of the image 134 to be rendered. In step 206, the command binning module 110 generates image depth information 136 for each display tile 132 based on the binned command information 128. The process ends in step 208.

Figure 3:
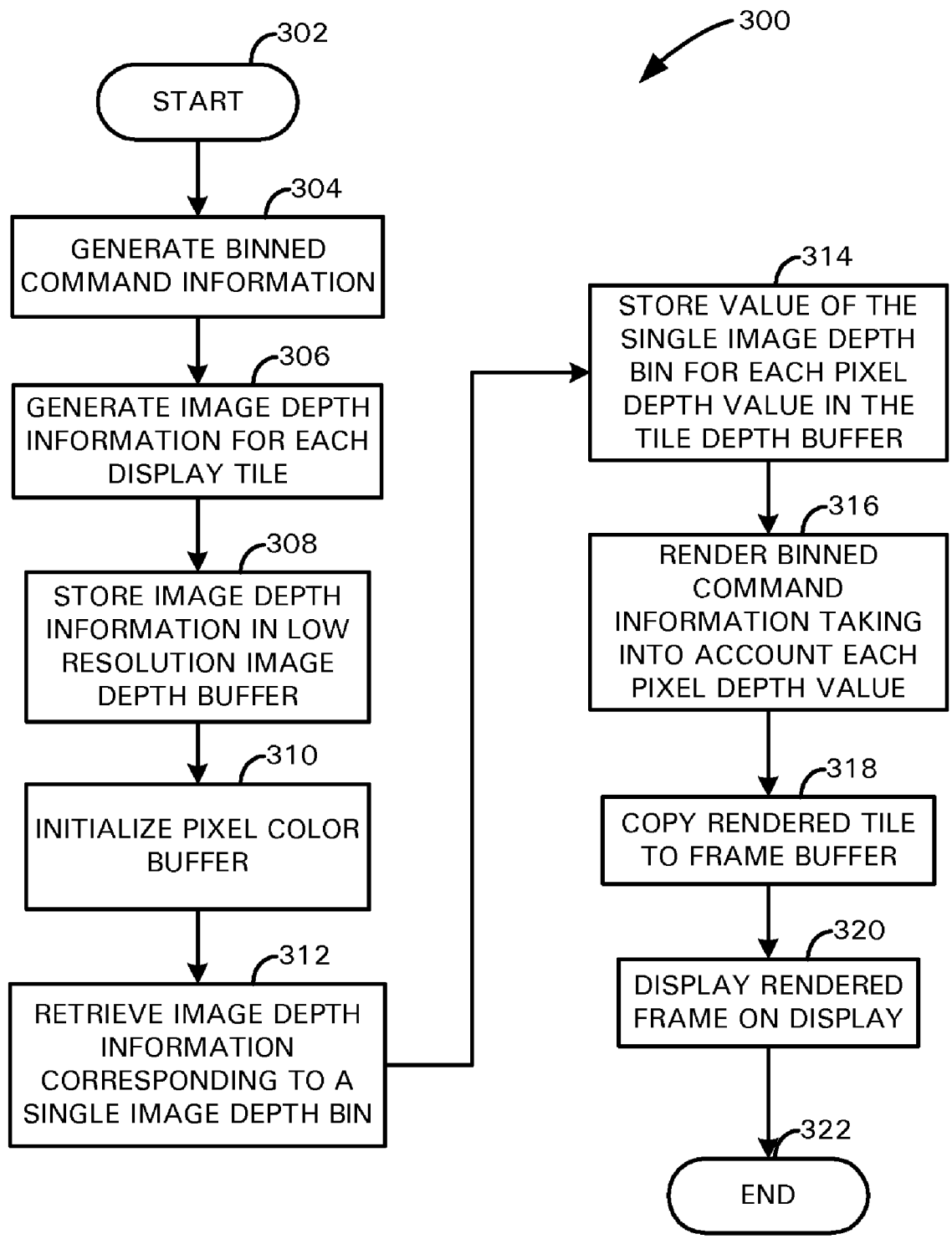
FIG. 3 is a flow chart depicting exemplary steps that can be taken by the apparatus when rendering an image.

Referring now to FIG. 3, exemplary steps that can be taken by the apparatus 102 to render the image 134 are generally identified at 300. The process starts in step 302 when the command binning module 100 receives the drawing command information 106. In step 304, the command binning module 100 generates the binned image information 128 by classifying the command information 106 into drawing command bins 130 that each correspond to a respective display tile 132 of the image 134 to be rendered. In step 306, the command binning module 110 generates image depth information 136 for each display tile 132 based on the binned command information 128. The image depth information 136 is stored in the image depth buffer 114 as image depth bins 138 in step 308.

In step 310, the image rendering module 116 initializes pixel color values 143 in the pixel color buffer 122 to an initial color value (e.g., zero). In some embodiments, the image rendering module 116 can also initialize pixel depth values 145 in the pixel depth buffer 120 to an initial depth value that represents the back culling plane or near culling plane of the image 134 if desired.

In step 312, the image rendering module 116 retrieves the image depth information 144 corresponding to the image depth bin 138 from the image depth buffer 114. In step 314, the image rendering module 116 stores the value of the image depth bin 138 for each pixel depth value 145 in the pixel depth buffer 120.

In step 316, the image rendering module 116 retrieves the binned drawing command information 146 corresponding a drawing command bin 130 that corresponds to the image depth bin 138 and renders the drawing command information 146 to the pixel color buffer 122 taking into account each pixel depth value 145 stored in the tile depth bin 120. As previously discussed, the image rendering module 116 compares the pixel depth value 145 against a current pixel depth value of the binned drawing command information 146. If the current pixel is behind the pixel depth value 145, the pixel is rejected, otherwise the pixel is rendered to pixel color buffer 122 and subsequently copied to the frame color buffer 126 of the frame buffer 118 in step 318. In step 320, the display 104 displays the image for a rendered frame based on rendered tiles 140 in the frame buffer 118. The process ends in step 320.

Also, a non-transitory computer readable medium, such as but not limited to CDROM, RAM, other forms of ROM, hard drives, distributed memory, etc., includes information that when executed by at least one processor causes the at least one processor to perform operations described herein. In one example, the non-transitory computer readable medium includes information that when executed by the at least one processor causes the at least one processor to, during a command binning pass, generate binned command information by classifying command information into bins that each correspond to a display tile of an image to be rendered and generate image depth information for each display tile based on the binned command information.

Among other advantages, image depth information is provided prior to the rendering pass, which allows an increased number of drawing commands to be discarded earlier than by conventional methods. In addition, providing image depth information prior to the rendering pass effectively reduces processing resources of the image rendering module and reduces time required to render the image. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. An apparatus for rendering an image, comprising:
   a command binning module implemented by at least one processor that is operative to:
      generate binned command information by classifying command information into bins that each correspond to a display tile of an image to be rendered; and
      generate image depth information for each display tile to produce a tile depth value based on the binned command information.

2. The apparatus of claim 1 further comprising: an image rendering module that is operative to populate a pixel depth buffer with pixel depth information based on the image depth information and to render the image based on the binned command information and the pixel depth information.

3. The apparatus of claim 2 further comprising an image depth buffer that is operative to store the image depth information for each display tile, wherein the image rendering module is operative to set each pixel depth value of the pixel depth buffer based on the image depth information.

4. The apparatus of claim 3 wherein the tile depth value corresponds to a depth value of all pixels in a tile, that is closest to one of a back culling plane and a near culling plane of the image.

5. The apparatus of claim 3 further comprising a color buffer, wherein the image rendering module is operative to provide a rendered tile of the image to the color buffer by rendering the binned command information corresponding to the display tile of the image.

6. The apparatus of claim 5 further comprising a frame buffer, wherein the image rendering module is operative to copy the rendered tile to the frame buffer and the frame buffer is operative to provide a rendered frame of the image based on at least the rendered tile.

7. The apparatus of claim 2 further comprising a display, operatively coupled to the image rendering module, that is operative to display the rendered image.

8. A method of rendering an image, comprising:
   during a command binning pass:
      generating, by a command binning module implemented by at least one processor, binned command information by classifying command information into bins that each correspond to a display tile of an image to be rendered; and
      generating, by the command binning module implemented by at least one processor, image depth information for each display tile to produce a tile depth value based on the binned command information.

9. The method of claim 8 further comprising:
   populating a pixel depth buffer with pixel depth information based on the image depth information; and
   rendering the image based on the binned command information and the pixel depth information.

10. The method of claim 9 further comprising storing the image depth information for each display tile in an image depth buffer and setting each pixel depth value in the pixel depth buffer based on the pixel depth information.

11. The method of claim 10 wherein the pixel depth information is based on the pixel depth value that is closest to one of a back culling plane and a near culling plane of the image.

12. The method of claim 10 further comprising providing a rendered tile of the image to a color buffer by rendering the binned command information corresponding to the display tile of the image.

13. The method of claim 12 further comprising copying the rendered tile to a frame buffer and providing a rendered frame of the image based on at least the rendered tile.

14. A non-transitory computer readable medium comprising information that when executed by at least one processor causes the at least one processor to:
   during a command binning pass:
      generate binned command information by classifying command information into bins that each correspond to a display tile of an image to be rendered; and
      generate image depth information for each display tile to produce a tile depth value based on the binned command information.

15. The non-transitory computer readable medium of claim 14 wherein the information comprises hardware description language.

16. The non-transitory computer readable medium of claim 14 wherein the information describes a circuit to generate binned command information and to generate image depth information.

* * * * *